United States Patent [19]

Mukasa et al.

[11] Patent Number: 4,638,387
[45] Date of Patent: Jan. 20, 1987

[54] COMPOSITION FOR SLIDING CONTACT PART OF RECORDING/REPRODUCING APPARATUS

[75] Inventors: Koichi Mukasa; Takashi Hatanai, both of Nigata; Keishi Nakashima, Yunotani; Kazumasa Onishi, Nigata, all of Japan

[73] Assignee: Alps Electric Co., Ltd., Japan

[21] Appl. No.: 558,328

[22] Filed: Dec. 5, 1983

[51] Int. Cl.$^4$ .................. G11B 5/187; G11B 15/60
[52] U.S. Cl. .................... 360/122; 360/130.21; 360/130.31
[58] Field of Search ............ 360/119, 120, 121, 122, 360/125, 127, 129, 130.2, 130.21, 130.3, 130.31; 428/408, 900, 143

[56] References Cited

U.S. PATENT DOCUMENTS

| | | | |
|---|---|---|---|
| 4,157,409 | 6/1979 | Levitt et al. | 428/408 |
| 4,161,005 | 7/1979 | Kato et al. | 360/129 |
| 4,220,884 | 9/1980 | Sternbergh | 428/408 |
| 4,434,202 | 2/1984 | Vedaira et al. | 428/143 |

FOREIGN PATENT DOCUMENTS

| | | | |
|---|---|---|---|
| 2219133 | 10/1974 | France | 428/408 |
| 5862864 | 10/1981 | Japan | 360/130.21 |

*Primary Examiner*—Robert S. Tupper
*Assistant Examiner*—Melissa J. Koval
*Attorney, Agent, or Firm*—Guy W. Shoup

[57] ABSTRACT

A recording/reproducing apparatus is disclosed, characterized in that a sliding contact part coming into sliding contact with a magnetic recording medium is provided at the upstream side, as determined by the running direction of the magnetic recording medium, of a magnetic head core, and at least a portion of the sliding contact part coming into sliding contact with the magnetic recording medium is made of a composite material comprising a carbonaceous material and a mechanical strength-increasing material. This is applicable to a magnetic head, an erasing head, a pad for a magnetic head, and a running guide member.

10 Claims, 7 Drawing Figures

COMPOSITION FOR SLIDING CONTACT PART OF RECORDING/REPRODUCING APPARATUS

FIELD OF THE INVENTION

The present invention relates to a recording/reproducing apparatus, e.g., a sound recording/reproducing apparatus, a video tape recorder (VTR), a magnetic disc recording/reproducing apparatus and a recording/reproducing apparatus for an electric computer, and is intended to reduce the abrasion of a magnetic head, etc. due to their sliding contact with a magnetic recording medium.

BACKGROUND OF THE INVENTION

Referring to FIG. 1, there is shown a magnetic head for use in a digital recording apparatus such as a flexible magnetic disc, comprising a recording/reproducing core 1 in which a recording/reproducing gap 1a has been previously formed, an erasing core 2 located at both sides of the recording/reproducing core 1, and an erasing gap 2a formed between the recording/reproducing core 1 and the erasing core 2. A core-holding member 3 is used to hold the cores 1 and 2.

In conventional magnetic heads, ceramics are commonly used in the production of the core-holding member 3. However, the core-holding member 3 made of ceramics is poor in the lubricity of the surface coming into sliding contact with the magnetic disc and, therefore, is seriously worn out. This gives rise to problems in that both the magnetic head and the magnetic disc are damaged, and recording/reproducing characteristics are reduced by powder resulting from the abrasion.

FIG. 2 is a perspective view of an erasing head, comprising a magnet-holding member 4 of a non-magnetic substance and a unipolar permanent magnet 5 held by the member 4.

In conventional erasing heads, the magnet-holding member is made of ceramics. In the case of erasing heads made of such ceramics, the lubricity of the surface coming into sliding contact with the magnetic recording medium is poor and, therefore, they are seriously worn out. Thus, both the erasing head and the magnetic recording medium are damaged, and magnetic characteristics are adversely influenced by powder resulting from the abrasion.

FIG. 3 is a front view illustrating the vicinity of a magnetic head of a magnetic disc recording/reproducing apparatus. A magnetic disc 7 is held between a pad 6 and a read/write head 8, and the close contact of the magnetic disc 7 to the magnetic head 8 is ensured by the pad 6. The reference numeral 9 indicates a magnetic head support.

Conventional pads are made of synthetic fibers. The lubricity of such pads relative to the magnetic disc is insufficient, producing the disadvantage that the magnetic disc and the pad are damaged.

Moreover, in a sound recording/reproducing apparatus, as shown in FIG. 4, a magnetic head is mounted at a predetermined location, and a magnetic tape 11 is guided by a tape guide 12 so that it runs while being in sliding contact with the magnetic head 10. In conventional apparatuses, the tape guide 12 is mainly made of metal. Therefore, the lubricity when in sliding contact with the magnetic tape 11 is poor, and the magnetic tape 11 is damaged, particularly the tape edge is seriously damaged.

SUMMARY OF THE INVENTION

The present invention is intended to overcome the above-described prior art problems, and provides a magnetic head, an erasing head, a pad for a magnetic head, and a guide member for the running of a recording medium, which have superior abrasion resistance and moveover show good lubricity with a magnetic recording medium.

It has been found that the object can be attained by employing a composite material consisting of a carbonaceous material and a mechanical strength-increasing material in the production of a running guide member, etc., at least the surface coming into sliding contact with a recording medium.

The present invention relates to a recording/reproducing apparatus characterized in that a sliding contact part coming into sliding contact with a magnetic recording medium is provided at the upstream side, as determined by the running direction of the magnetic recording medium, of a magnetic head core, and at least a portion of the sliding contact part, said portion coming into sliding contact with the magnetic recording medium, is made of a composite material comprising a carbonaceous material and a mechanical strength-increasing material.

BRIEF DESCRIPTION OF THE DRAWINGS

FIG. 1 is a perspective view of a magnetic head for a magnetic disc,

FIG. 2 is a perspective view of an erasing head,

FIG. 3 is a front view of the vicinity of a magnetic head of a magnetic disc recording/reproducing apparatus, and FIG. 4 is a perspective view of the vicinity of a magnetic head of a sound recording/reproducing apparatus.

FIG. 5 is a plan view of the vicinity of a magnetic head according to an embodiment of the invention, FIG. 6 is a plan view of the vicinity of a magnetic head according to another embodiment of the invention, and FIG. 7 is a perspective view of a magnetic head according to another embodiment of the invention.

Figure 1:
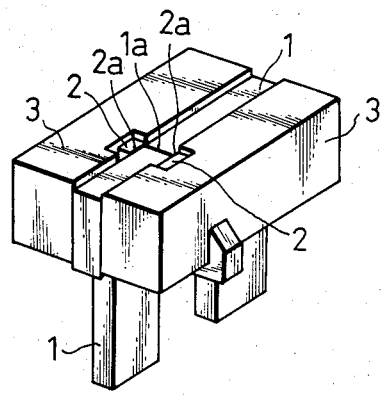
FIGS. 1 to 4 are given to illustrate conventional recording/reproducing devices.
Figure 2:
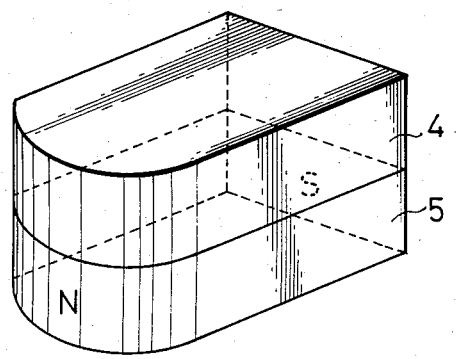
Figure 3:
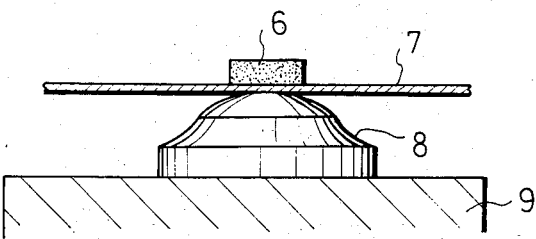
Figure 4:
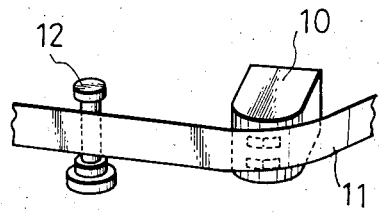

The reference numerals 13, 14, 15, 16 and 17 indicate the following:

13 . . . Magnetic tape
14 . . . Magnetic head
15 . . . Sliding contact member
16 . . . Core
17 . . . Sliding contact portion

DETAILED DESCRIPTION OF THE INVENTION

The present invention will hereinafter be explained by reference to the accompanying drawings.

Figure 5:
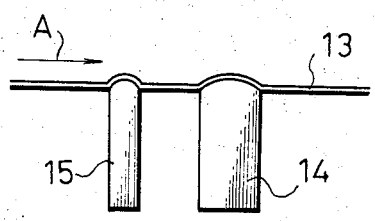
FIGS. 5 to 7 are given to illustrate embodiments of the invention.

Referring to FIG. 5, there is shown an embodiment of the invention. A magnetic tape 13 is sent in a predetermined direction while being in sliding contact with a magnetic head 14. At the upstream side, as determined by the running direction of the magnetic tape as indicated by the symbol A, of the magnetic head 14 is placed a sliding contact member 15 to reduce the abrasion of the magnetic head 14, with some distance there-between. The material of the sliding contact member 15 is described in detail hereinafter.

Figure 6:
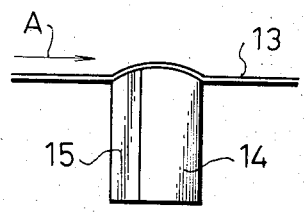

FIG. 6 is a view showing another embodiment of the invention. This second embodiment is different from the above first embodiment in that the magnetic head 14 and the sliding contact member 15 are combined together.

Figure 7:
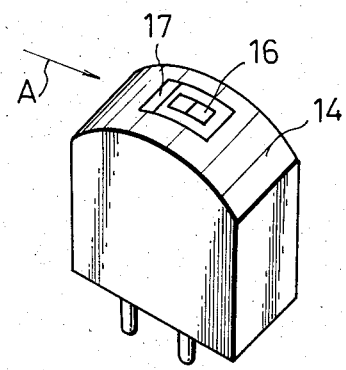

FIG. 7 is a view showing the third embodiment of the invention. In this embodiment, a sliding contact portion 17 is formed in the magnetic head 14 at a resin-coated area of the core 16 and moreover at the upstream side as determined by the running direction of the magnetic tape.

The foregoing sliding contact member 15 or sliding contact portion 17 (hereinafter collectively referred to as a "sliding contact part") is made of a composite material comprising a carbonaceous material and a mechanical strength-increasing material.

The composite material as used herein is described in detail.

Carbonaceous materials which can be used for the preparation of the composite material include natural graphite, synthetic graphite, coal coke, oil coke, carbon black, and coal powder. These carbonaceous materials may be either carbonaceous or graphitic, or may be a mixture of carbonaceous and graphitic materials.

These carbonaceous materials are not sufficiently high in mechanical strength although they have superior self-lubricity. For this reason, a mechanical strength-increasing material is used. These mechanical strength-increasing materials include binders and impregnating materials. These binders and impregnating materials may be used separately or in combination with each other.

Binders which can be used include resinous binders, pitch coke binders, and metallic binders. As resinous binders, various thermosetting resins such as a phenol resin, a divinylbenzene resin, a furan-based resin, and an epoxy resin, and various thermoplastic resins such as a fluorine resin and a polyacetal resin can be used. These resinous binders can be carbonized or graphitized by heat-treating in an inert atmosphere after the completion of bonding.

The above-described pitch coke binders are applied as coal pitch or oil pitch for a binding material and, after bonding, converted into pitch coke by sintering.

Metallic binders which can be used include copper, nickel, iron, manganese, chromium, cobalt, titanium, molybdenum, tungsten, etc. and alloys of such metals. The carbonaceous material and the metallic binder are mixed in a given ratio and press-molded and, thereafter, sintered, or press-molding and sintering may be applied at the same time.

In the composite material comprising the carbonaceous material and the binder, fine voids are sometimes formed in the surface of the composite material or in the inside thereof depending on the type of the binder, a method of production of the composite material, and so forth. Although such fine voids are formed, the resulting material can be used as such depending on the state of the voids. However, the formation of such fine voids is not desirable because it leads to a reduction in the mechanical strength of the sliding contact part, the core-holding member, the magnet-holding member, the pad, the running guide member, etc, or it causes to damage the magnetic recording medium. In order to fill the fine voids, increasing the mechanical strength and at the same time, producing surface smoothness, an impregnating material is used in the invention. Examples of such impregnating materials include organic compounds such as synthetic resins, and metallic or non-metallic inorganic compounds.

Organic compounds impregnating materials which can be used include a phenol resin, a divinylbenzene resin, an epoxy resin, a furan resin, a fluorine resin, a polyethylene resin, a polypropylene resin, and a polyamide resin.

As metallic impregnating materials, tin, antimony, copper, zinc, silver, lead, aluminum, magnesium, cadmium, etc., and their alloys can be used. In the case of the metallic impregnating materials, impregnation is carried out at about 50°-100° C. higher temperatures than the melting points of the materials. Therefore, when the metallic binder is used, it is desirable that the difference in melting point between the metallic binder and the metallic impregnating material be at least about 150° C.

An example of the above-described non-metallic inorganic compounds is borosilicate glass.

The carbonaceous material content of the composite material of the invention is from about 50 to 95% by volume. If the carbonaceous material content is less than about 50% by volume, no sufficient lubricity is obtained and the resulting head damages magnetic recording media. On the other hand, if the carbonaceous material content exceeds about 95% by volume, the mechanical strength, particularly the loss due to sliding contact with the magnetic recording media is increased, resulting in the formation of a clearance between the core and the core-holding member. As a result, it is responsible for the damage of the magnetic recording medium.

In the present invention, the whole of each of the sliding contact part, the core-holding member, the magnet-holding member, the pad, and the running guide may be made of the composite material comprising the carbonaceous material and the mechanical strength-increasing material, or only a surface portion coming into sliding contact with the magnetic recording medium of the sliding contact part is made of the foregoing composite material, and other portions are made of, e.g., ceramics, and the composite material piece and the ceramic piece are bonded together by, e.g., glass, to construct a sliding contact part, a core-holding member, a magnet-holding member, and a pad.

The material of the sliding contact part is described in detail by reference to the following examples.

MATERIAL EXAMPLE 1

To a fine powdery carbonaceous material which had been adjusted in size to less than a predetermined level was added a small amount of pitch as a binder, which were then fully stirred and mixed and, thereafter, press-molded in the form of a substrate. The thus-produced mold was then sintered at about 1,100° C. in a nitrogen atmosphere and, thereafter, placed in an autoclave. By keeping the autoclave in a vacuum, gases contained in the sintered body were removed and, thereafter, the sintered body was impregnated under pressure with a metallic impregnating material (antimony-tin) which had been melted. In the thus-produced sliding contact part, the carbonaceous material content is about 85% by volume, the metallic impregnating material content was about 15% by volume, and the bulk specific gravity of the sliding contact part was about 2.7 g/cm$^3$.

MATERIAL EXAMPLE 2

By impregnating a sintered body with a divinylbenzene resin in place of the metallic impregnating material in Material Example 1, a sliding contact part of predetermined shape was obtained. In this sliding contact part, the carbonaceous material content was about 85% by volume and the organic compound impregnating material content was about 15% by volume.

MATERIAL EXAMPLE 3

Fine powdery graphite (70% by volume) of 325 mesh or less and fine powdery copper (30% by volume) of 325 mesh or less were fully mixed and hot pressed at a temperature higher than the melting point of copper to produce a sliding contact part. If both the carbonaceous material and the metallic binder are used in a fine powder form, a sliding contact part is obtained which is of high packing density and of dense structure.

MATERIAL EXAMPLE 4

Fine powdery graphite was added to a phenol resin solution and fully stirred and mixed. The resulting mixture was coated on a sliding contact part of ceramics at a surface coming into sliding contact with a magnetic tape and, thereafter, the phenol resin was cured by heating to obtain a sliding contact part surface having a lubricant layer of abrasion resistance.

MATERIAL EXAMPLE 5

By impregnating a sintered body with borosilicate glass in place of the metallic impregnating material in Material Example 1, a sliding contact part of predetermined shape was obtained. In this sliding contact part, the carbonaceous material content was about 80% by volume and the non-metallic inorganic compound impregnating material content was about 20% by weight.

MATERIAL EXAMPLE 6

A fine powdery carbonaceous material and a fine powdery metal (e.g., copper, nickel or an alloy of copper and nickel) were mixed and hot pressed at a temperature higher than the melting point of the metallic binder to produce a sliding contact part. Thereafter, the sintered body was placed in an autoclave, which was then reduced in a vacuum to remove gases contained in the sintered body. The sintered body was then impregnated with a liquid member (a dispersion or a solution) of a fluorine resin. The carbonaceous material content of the sliding contact part was about 60% by volume.

Although the present invention is explained by reference to a sliding contact part in the foregoing examples, it is applicable also to a core-holding member, a magnet-holding member, a pad, and a running guide member. Moreover, although a sound recording/reproducing apparatus is explained in the above examples, the present invention is not limited thereto, but is also applicable to, for example, VTR, a magnetic disc recording/reproducing apparatus, and a recording/reproducing apparatus for an electric computer.

The recording/reproducing apparatus of the invention is of the structure as described above, and shows superior abrasion resistance. Thus the present invention provides a recording/reproducing apparatus equipped with a magnetic head, an erasing head, a pad for a magnetic head, and a running guide member, showing good lubricity with a magnetic recording medium.

What is claimed is:

1. A recording/reproducing apparatus characterized in that a sliding contact part coming into sliding contact with a magnetic recording medium is provided adjacent a magnetic head core on an upstream side thereof, as determined by a running direction of the magnetic recording medium relative to the magnetic head core, and at least a portion of the sliding contact part, said portion coming into sliding contact with the magnetic recording medium, is made of a composite material comprising a carbonaceous material, of 50-95% by volume, and a mechanical strength-increasing material.

2. A recording/reproducing apparatus characterized in that at least a portion of a core-holding member, said portion coming into sliding contact with a magnetic recording material, is made of a composite material comprising a carbonaceous material, of 50-95% by volume, and a mechanical strength-increasing material, and a magnetic head is composed of the composite material.

3. A recording/reproducing apparatus characterized in that a magnet and a magnet-holding member made of a non-magnetic substance are provided, at least a surface of the magnet holding member coming into sliding contact with a magnetic recording medium being made of a composite material comprising a carbonaceous material, of 50-95% by volume, and a mechanical strength-increasing material.

4. A recording/reproducing apparatus characterized in that at least a portion of a pad for a magnetic head, said portion coming into sliding contact with a magnetic recording medium, is made of a composite material comprising a carbonceous material of 50-95% by volume, and a mechanical strength-increasing material.

5. A recording/reproducing apparatus characterized in that at least a portion of a running guide member for a magnetic recording medium, said portion coming into sliding contact with the medium, is made of a composite material comprising a carbonaceous material, of 50-95% by volume, and a mechanical strength-increasing material.

6. A recording/reproducing apparatus as claimed in claim 1, 2, 3, 4 or 5, wherein the composite material is composed of a carbonaceous material-containing porous sintered substrate impregnated with a metal.

7. A recording/reproducing apparatus as claimed in claim 1, 2, 3, 4 or 5, wherein the composite material is composed of a carbonaceous material-containing porous sintered substrate impregnated with a synthetic resin.

8. A recording/reproducing apparatus as claimed in claim 1, 2, 3, 4 or 5, wherein the composite material is composed of a carbonaceous material-containing porous sintered substrate impregnated with a non-metallic inorganic compound.

9. A recording/reproducing apparatus as claimed in claim 1, 2, 3, 4, or 5, wherein the composite material is produced by hot pressing a mixture of the carbonaceous material and the mechanical strength-increasing material.

10. A recording/reproducing apparatus as claimed in claim 1, 2, 3, 4 or 5, wherein the mechanical strength-increasing material is composed of a metallic binder and a metallic impregnating material having a melting point lower than that of the metallic binder, and the porous sintered body produced from the carbonaceous material and the metallic binder is impregnated with the metallic impregnating material.

* * * * *